US011361108B1

(12) United States Patent
Johnson

(10) Patent No.: US 11,361,108 B1
(45) Date of Patent: Jun. 14, 2022

(54) UNIDIRECTIONAL COMMUNICATION SYSTEM FOR PUBLIC ACCESS TO DETAINED PERSONS

(71) Applicant: TSJ TECHNOLOGY, INC., Huntsville, TX (US)

(72) Inventor: Tamara Sharday Johnson, Crockett, TX (US)

(73) Assignee: TSJ Technology, Inc., Huntsville, TX (US)

( * ) Notice: Subject to any disclaimer, the term of this patent is extended or adjusted under 35 U.S.C. 154(b) by 0 days.

(21) Appl. No.: 17/199,178

(22) Filed: Mar. 11, 2021

(51) Int. Cl.
*G06F 21/62* (2013.01)
*H04L 9/40* (2022.01)

(52) U.S. Cl.
CPC ...... *G06F 21/6272* (2013.01); *H04L 63/0209* (2013.01)

(58) Field of Classification Search
CPC .................. G06F 21/6272; H04L 63/0209
See application file for complete search history.

(56) References Cited

U.S. PATENT DOCUMENTS

| | | | |
|---|---|---|---|
| 7,113,163 B2 | 9/2006 | Nitta et al. | |
| 7,844,166 B2 | 11/2010 | Takahashi | |
| 8,280,359 B2 | 10/2012 | Moshir et al. | |
| 8,391,843 B2 | 3/2013 | Lee et al. | |
| 8,677,152 B2 * | 3/2014 | Kahn ................. | H04N 21/4405 713/193 |
| 9,030,292 B2 * | 5/2015 | Torgersrud .............. | G06F 21/32 340/5.53 |
| 9,338,405 B2 * | 5/2016 | Millar ................. | H04N 7/1675 |
| 9,654,817 B2 * | 5/2017 | Li ..................... | H04N 21/41407 |
| 9,680,878 B2 | 6/2017 | Hodge et al. | |
| 9,692,718 B2 | 6/2017 | Bennett | |
| 9,787,724 B2 | 10/2017 | Hodge et al. | |
| 9,843,589 B2 * | 12/2017 | Gupta ..................... | H04L 41/28 |
| 10,032,066 B2 | 7/2018 | Gongaware et al. | |
| 10,209,773 B2 | 2/2019 | Khaderi et al. | |
| 10,313,632 B2 | 6/2019 | Humphries | |
| 10,362,018 B2 | 7/2019 | Helms et al. | |
| 10,380,683 B1 | 8/2019 | Voutour et al. | |
| 10,666,899 B2 * | 5/2020 | Humphries ........... | H04M 17/20 |
| 10,674,116 B2 * | 6/2020 | Drako ................. | H04L 65/4069 |
| 10,726,365 B2 * | 7/2020 | Torgersrud ........... | G06Q 10/063 |
| 10,848,808 B2 * | 11/2020 | Drako ............. | H04N 21/41407 |
| 11,258,981 B2 * | 2/2022 | Humphries ............. | H04W 4/24 |
| 2003/0208890 A1 | 11/2003 | Kim | |
| 2006/0245559 A1 | 11/2006 | Hodge et al. | |

(Continued)

FOREIGN PATENT DOCUMENTS

CN    103765453 B1    8/2018
EP    1443390 A1    8/2004

(Continued)

*Primary Examiner* — Viral S Lakhia
(74) *Attorney, Agent, or Firm* — Vinson & Elkins L.L.P.

(57) ABSTRACT

A unidirectional communication system for public access to detained persons enables a facility administrator of an incarceration facility to review and approve multimedia content provided by an outside contactperson for playback by a detainee of the incarceration facility. The unidirectional communication system may enable an outside contactperson to communicate with a plurality of detainees or a detainee to receive communications from a plurality of outside contactpersons.

18 Claims, 6 Drawing Sheets

(56) References Cited

U.S. PATENT DOCUMENTS

| | | | |
|---|---|---|---|
| 2010/0299761 | A1 | 11/2010 | Shapiro |
| 2013/0179949 | A1 | 7/2013 | Shapiro |
| 2015/0120696 | A1 | 4/2015 | Blemaster |
| 2018/0032350 | A1 | 2/2018 | Lee et al. |
| 2019/0132631 | A1 | 5/2019 | De La Vega |
| 2020/0396423 | A1* | 12/2020 | Drako ............... H04N 7/01 |
| 2021/0183501 | A1* | 6/2021 | Geis ................ G16H 15/00 |
| 2021/0368288 | A1* | 11/2021 | Di Corpo ........... H04W 4/029 |

FOREIGN PATENT DOCUMENTS

| | | |
|---|---|---|
| JP | 2004102590 A1 | 4/2004 |
| TW | I305899 B1 | 2/2009 |

* cited by examiner

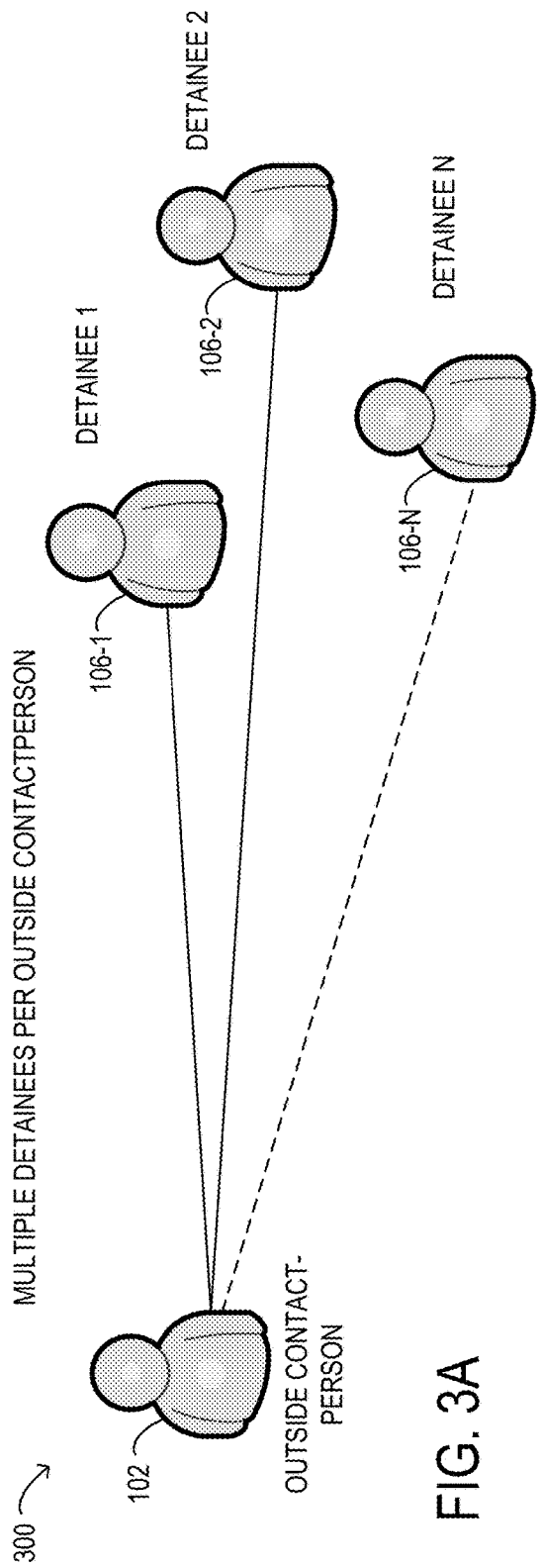
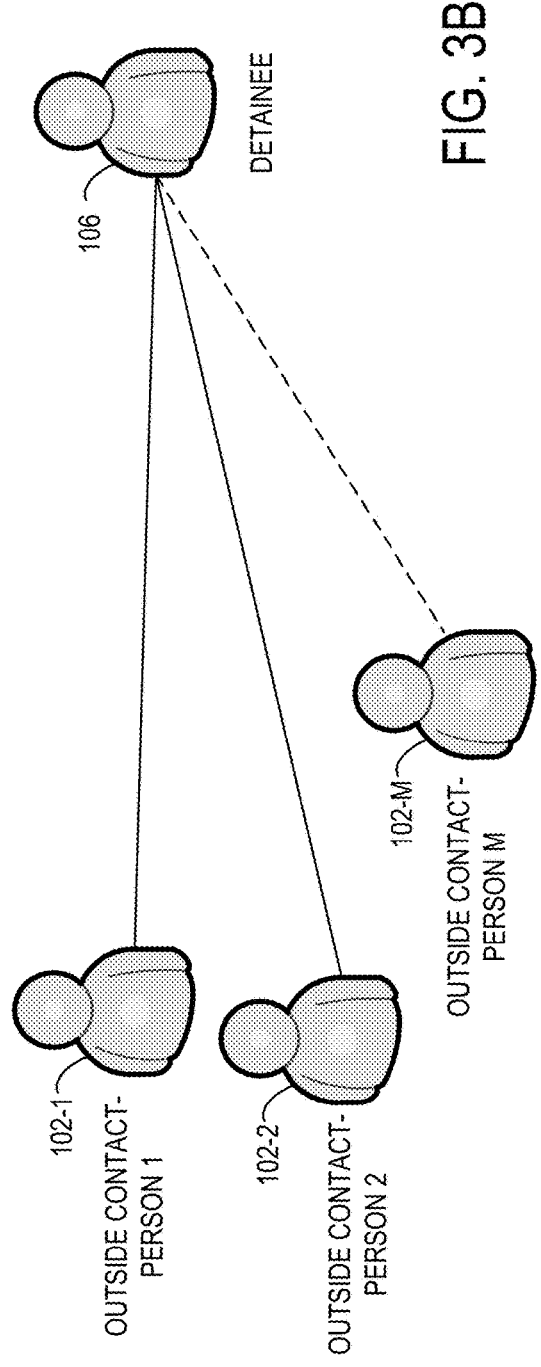

UNIDIRECTIONAL COMMUNICATION SYSTEM FOR PUBLIC ACCESS TO DETAINED PERSONS

BACKGROUND

Field of the Disclosure

The present disclosure relates to multimedia communication systems, and more particularly, to a unidirectional communication system for public access to detained persons.

Description of the Related Art

The ability to communicate with a desired counterparty is a basic freedom that is generally available to anyone. However, a person who is detained at a government or private facility, such as a prison, a jail, a mental hospital, a rehabilitation clinic, or other incarceration facility, may be subject to significant restrictions of their communication rights. Such a detained person, referred to herein as a "detainee" (also commonly referred to as an inmate, a prisoner, a patient, a ward, a captive, a convict, a confinee, an incarceree, or an addict, among other terms), may have their right and ability to communicate freely be restricted while detained, as well as having their access to communication equipment and network devices be controlled or limited. For example, a detainee who is an inmate at an incarceration facility may have limited rights to communicate with external counterparties, such as friends or family members.

Typically such incarceration facilities do provide some limited personal visitations where visitors may come into direct contact with the detainee for a period of time. However, such personal visitations may be difficult for family members of detainees to attend, whether due to the distance to the incarceration facility or a limited available schedule of such visitations.

The restrictions on the personal visitations may be set up and enforced to maintain security at the incarceration facility, such as to prevent undesired communications with the detainee that may create a risk for personnel at the facility or that may otherwise violate communication policies of the facility. As a result of the significant security profile that is applied to communications with detainees at incarceration facilities, there may be significant complexity and risk in providing a means of communication to the external world for the detainee.

Despite such risks, on the other hand, there may nonetheless be substantial public benefit to providing detainees with ongoing and regular communication with external contact persons and family members. For example, maintaining family relations through such regular communications may have a positive impact on the demeanor and behavior of the detainee while incarcerated. Furthermore, the detainee may experience an easier transition to productive life after incarceration, and with greater social support, when relationships and communication with external persons can be maintained, at least to a degree, during incarceration. Furthermore, the external contact persons may also maintain an improved relationship with the detainee when regular and ongoing contact is possible. For example, the detainee may better remain engaged in family relationships when the detainee is able to have contact and memory associated with important family events that occur during their incarceration.

BRIEF DESCRIPTION OF THE DRAWINGS

FIGS. 3A and 3B are respective block diagram of selected elements of account options for a unidirectional communication system;

SUMMARY

Figure 1:
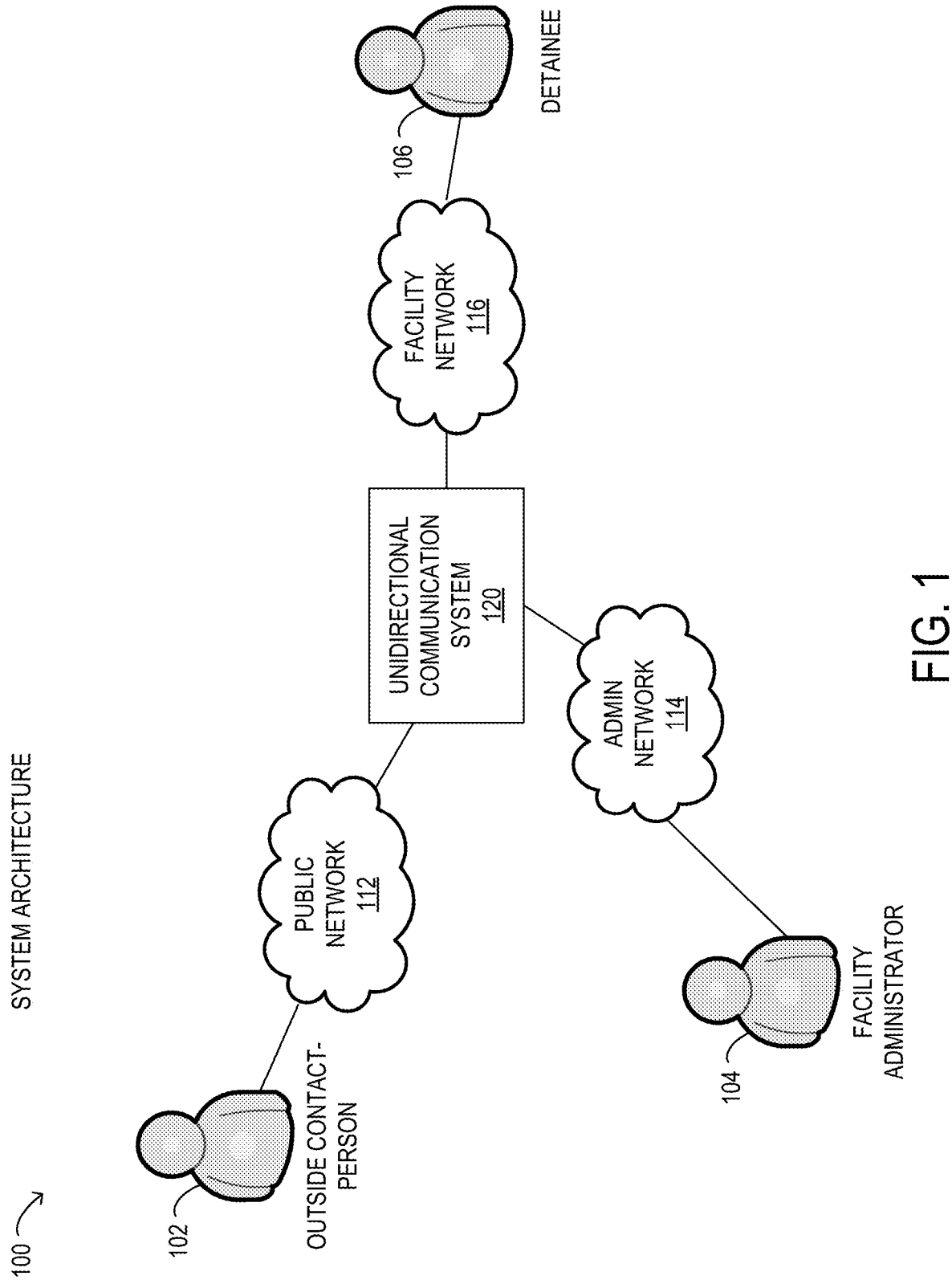
FIG. 1 is a block diagram of a system architecture.

In one aspect, a system for unidirectional communication for public access to detained persons is disclosed. The system may include at least one processor having access to memory media storing instructions executable by the processor for enabling an outside contactperson to register an account and to associate the account with at least one detainee in an incarceration facility, receiving, from the outside contactperson, first multimedia content intended for viewing by the detainee, and enabling a facility administrator of the incarceration facility to review the first multimedia content. Responsive to the facility administrator reviewing the first multimedia content, the system may further include instructions for receiving approval by the facility administrator for the detainee to view second multimedia content included in the first multimedia content. Responsive to the facility administrator approving the second multimedia content, the system may further include instructions for enabling the second multimedia content to be played by the detainee while the detainee is incarcerated at the incarceration facility, and during playing of the second multimedia content by the detainee, enabling the detainee to mark third multimedia content included in the second multimedia content, wherein the detainee is permitted to retain possession of the third multimedia content. After playing of the second multimedia content by the detainee, the system may further include instructions for deleting the second multimedia content.

In any of the disclosed embodiments of the system, the detainee being permitted to retain possession of the third multimedia content may further include instructions for sending an indication of the third multimedia content to the facility administrator, and enabling the facility administrator to generate a hardcopy printout indicative of the third multimedia content. In the system, the facility administrator may provide the hardcopy printout to the detainee while the detainee is incarcerated at the incarceration facility.

In any of the disclosed embodiments of the system, the detainee being permitted to retain possession of the third multimedia content may further include instructions for sending an indication of the third multimedia content to the facility administrator, enabling the facility administrator to store the third multimedia content until the detainee is eligible for release from the incarceration facility, and enabling the facility administrator to record the third multimedia content on a storage medium. In the system, the third multimedia content may include the second multimedia content, while the storage medium may be given to the detainee upon the release from the incarceration facility.

In any of the disclosed embodiments, the system may further comprise instructions for at least one of charging the detainee for the third multimedia content, and charging the outside contactperson for receiving the first multimedia content.

In any of the disclosed embodiments, the system may further comprise instructions for receiving administrative multimedia content from the facility administrator, and enabling the detainee to playback the administrative multimedia content.

In any of the disclosed embodiments, the system may further comprise instructions for enabling the outside contactperson to search from a plurality of detainees to identify the detainee.

In any of the disclosed embodiments, the system may further comprise instructions for enabling the outside contactperson to search from a plurality of incarceration facilities to identify the detainee.

In any of the disclosed embodiments, the system may further comprise instructions for enabling the outside contactperson to search for a plurality of detainees, including the detainee, and associating the account with the plurality of detainees.

In any of the disclosed embodiments of the system, enabling the detainee to playback the second multimedia content while the detainee is incarcerated at the incarceration facility may further include instructions for enabling the detainee to playback the second multimedia content one time on a secure device at the incarceration facility.

In any of the disclosed embodiments, the system may further comprise instructions for enabling a plurality of outside contactpersons to respectively associate a plurality of accounts with the detainee.

In another aspect, a computer-implemented method for unidirectional communication for public access to detained persons is disclosed. The method may include enabling an outside contactperson to register an account and to associate the account with at least one detainee in an incarceration facility, receiving, from the outside contactperson, first multimedia content intended for viewing by the detainee, and enabling a facility administrator of the incarceration facility to review the first multimedia content. Responsive to the facility administrator reviewing the first multimedia content, the method may further include receiving approval by the facility administrator for the detainee to view second multimedia content included in the first multimedia content. Responsive to the facility administrator approving the second multimedia content, the method may further include enabling the second multimedia content to be played by the detainee while the detainee is incarcerated at the incarceration facility. During playing of the second multimedia content by the detainee, the method may further include enabling the detainee to mark third multimedia content included in the second multimedia content. In the method, the detainee is permitted to retain possession of the third multimedia content. After playing of the second multimedia content by the detainee, the method may further include deleting the second multimedia content.

In any of the disclosed embodiments of the method, the detainee being permitted to retain possession of the third multimedia content may further include sending an indication of the third multimedia content to the facility administrator and enabling the facility administrator to generate a hardcopy printout indicative of the third multimedia content. In the method, the facility administrator may provide the hardcopy printout to the detainee while the detainee is incarcerated at the incarceration facility.

In any of the disclosed embodiments of the method, the detainee being permitted to retain possession of the third multimedia content may further include sending an indication of the third multimedia content to the facility administrator, enabling the facility administrator to store the third multimedia content until the detainee is eligible for release from the incarceration facility, and enabling the facility administrator to record the third multimedia content on a storage medium. In the method, the third multimedia content may include the second multimedia content, while the storage medium may be given to the detainee upon the release from the incarceration facility.

In any of the disclosed embodiments, the method may further include at least one of charging the detainee for the third multimedia content, and charging the outside contactperson for receiving the first multimedia content.

In any of the disclosed embodiments, the method may further include receiving administrative multimedia content from the facility administrator, and enabling the detainee to playback the administrative multimedia content.

In any of the disclosed embodiments, the method may further include enabling the outside contactperson to search from a plurality of detainees to identify the detainee.

In any of the disclosed embodiments, the method may further include enabling the outside contactperson to search from a plurality of incarceration facilities to identify the detainee.

In any of the disclosed embodiments, the method may further include enabling the outside contactperson to search for a plurality of detainees, including the detainee, and associating the account with the plurality of detainees.

In any of the disclosed embodiments of the method, enabling the detainee to playback the second multimedia content while the detainee is incarcerated at the incarceration facility may further include enabling the detainee to playback the second multimedia content one time on a secure device at the incarceration facility.

In any of the disclosed embodiments, the method may further include enabling a plurality of outside contactpersons to respectively associate a plurality of accounts with the detainee.

DETAILED DESCRIPTION

As noted above, there may be substantial public benefit to providing detainees with ongoing and regular communication with external persons and family members. However due to security profiles and requirements at incarceration facilities, such external communications with detainees may be subject to various constraints, such as review and approval processes.

As will be described in further detail, a unidirectional communication system for public access to detainees of incarceration facilities is disclosed. The unidirectional communication system disclosed herein may enable an outside contactperson, such as a family member of the detainee, to create an account with the unidirectional communication system and provide multimedia content for subsequent playback or playing by the detainee. The multimedia content may include video, audio, images, or various combinations thereof, such as videos of family events or recorded messages from various persons to the detainee. The unidirectional communication system disclosed herein may enable the outside contactperson to render payment for the communication services provided by the unidirectional communication system. The unidirectional communication system disclosed herein may enable the outside contactperson to search for a particular detainee among a plurality of different incarceration facilities, such as different incarceration facilities in a given jurisdiction or associated with a given governmental agency, for example. The unidirectional communication system disclosed herein may enable the outside contactperson to communicate with a plurality of different detainees, such as by providing multimedia content for each individual detainee on the account of the outside contactperson. The unidirectional communication system disclosed herein may further enable a facility administrator of the incarceration facility to review and approve or deny the multimedia content provided by the outside contactperson. The unidirectional communication system disclosed herein may store the multimedia content until the detainee has viewed the multimedia content, and afterwards, may automatically delete the multimedia content. The unidirectional communication system disclosed herein may enable the detainee to view the multimedia content on a secure system associated with the incarceration facility. The unidirectional communication system disclosed herein may enable the detainee to save the multimedia content until the incarceration term of the detainee has ended, and then to purchase a digital copy of the multimedia content, such as stored on storage media, upon release of the detainee. The unidirectional communication system disclosed herein may enable the detainee to mark certain portions of the multimedia content, such as individual frames in a video, that may be captured and made available to the detainee, such as in the form of a hardcopy printout, during incarceration.

Referring now to the drawings, FIG. 1 illustrates a system architecture 100 associated with a unidirectional communication system 120, as disclosed herein. As shown in FIG. 1, system architecture 100 depicts the stakeholders and external networks used to access unidirectional communication system 120, of which certain internal aspects are not depicted for descriptive clarity and are described in further detail below (see also FIG. 2). An outside contactperson 102 may represent a first user of unidirectional communication system 120 who may be any person that desires to send multimedia content to a detainee 106 who is incarcerated at an incarceration facility (not shown). Outside contactperson 102 may access unidirectional communication system 120 via a public network 112, such as the internet or a telecommunications network, for example. A facility administrator 104 may be a second user of unidirectional communication system 120 who is an administrator on behalf of the incarceration facility, such as a mail room administrator or a similar functional role, for example. Facility administrator 104 may access unidirectional communication system 120 via an admin network 114, which may represent a network system associated with administrative services for the incarceration facility. Detainee 106 may be a third user of unidirectional communication system 120 who is the recipient of the multimedia content sent by outside contactperson 102. Detainee 106 may access unidirectional communication system 120 via a facility network 116, which may represent a network system associated with high security to provide detainee services for the incarceration facility.

As shown in FIG. 1, a user accessing a network, such as detainee 106 accessing corresponding facility network 116, is intended to include the user utilizing a computing device (not shown), such as a computer system or a smart phone device, to access the corresponding network, network functionality, or other related network devices and systems, such as unidirectional communication system 120 or portions thereof. In some embodiments, the access to the corresponding network may be provided as a software interface, such as a web portal or other application software that the user can operate.

In FIG. 1, outside contactperson 102 may desire to send a message in the form of multimedia content to a detainee 106 who is incarcerated at an incarceration facility (not shown). Accordingly, unidirectional communication system 120 may provide one or more first user interfaces for outside contactperson 102, such as a web browser interface, an interactive voice interface, or a text message interface, among other options. The first user interface for outside contactperson 102 may enable creation of an account with unidirectional communication system 120, validation of an identity of outside contactperson 102, as well as uploading of the multimedia content to unidirectional communication system 120. Additionally, unidirectional communication system 120 may enable outside contactperson 102 to be associated with a given list of detainees, or with a limited number of detainees, from which detainee 106 may be selected. Further, unidirectional communication system 120 may enable outside contactperson 102 to search and locate detainee 106, such as among different locations or different incarceration facilities. When outside contactperson 102 desires to use digital services provided by unidirectional communication system 120 that are subject to a fee or a price, unidirectional communication system 120 may be enabled to receive payment from outside contactperson 102 for such digital services. For example, in various embodiments, unidirectional communication system 120 may charge certain fees for creating an account, receiving the multimedia content, accessing detainee 106, storing the multimedia content, and transmitting the multimedia content to detainee 106.

After the multimedia content has been uploaded, unidirectional communication system 120 may then enable a facility administrator 104 who is associated with the incarceration facility to review and approve the multimedia content. For example, unidirectional communication system 120 may provide a second user interface for operation by facility administrator 104. In some embodiments, unidirectional communication system 120 may perform an automatic digital analysis of the multimedia content prior to review by facility administrator 104. The automatic digital analysis may be based on a security profile for the incarceration facility, such as to detect certain keywords that are forbidden, or to detect certain kinds of communication that are forbidden for detainee 106. In some embodiments, facility administrator 104 may be provided with an indication or a result of the automatic digital analysis. Facility administrator 104 may then perform an additional review, either manually or with a certain content analysis tool or both in combination. In some embodiments, unidirectional communication system 120 may enable facility administrator 104 to use a plug-in digital analysis tool, such as a tool or an algorithm selected by facility administrator 104. After review of the digital content, facility administrator 104 may approve all or some of the multimedia content. In some cases, facility administrator 104 may suppress or delete certain portions of the multimedia content before detainee 106 may view the multimedia content. After review, facility administrator 104 may post the approved multimedia content in a location associated with detainee 106. For example, the location may be a file location in a file system that detainee 106 can access. In some cases, a value (such as a boolean value or a flag) in a database may signify that the approved multimedia content is now available for playing by detainee 106 and is accessible by detainee 106.

After facility administrator 104 has made the approved multimedia content accessible to detainee 106, detainee 106 may be sent a notification that one or more items of approved multimedia content are available for playback. Unidirectional communication system 120 may provide a third user interface for detainee 106 for selecting and playing approved multimedia content designated for detainee 106. Detainee 106 may thus receive different items of approved multimedia content from different ones of outside contactperson 102 that may collectively be presented to detainee 106 for playback using the third user interface. Depending on procedures and regulations of the incarceration facility, detainee 106 may be restricted by time or by number of accesses or otherwise to a playback system for the approved multimedia content. The playback system may be on the premises of the incarcerated facility and may be accessible to detainee 106. For example, unidirectional communication system 120 may provide a third user interface specifically for detainee 106. In this manner, unidirectional communication system 120 may control playback of the approved multimedia content by detainee 106. For example, unidirectional communication system 120 may provide a preview of the approved multimedia content to detainee 106 before detainee 106 plays back the approved multimedia content. In some implementations, detainee 106 may be allowed by unidirectional communication system 120 to playback the entire approved multimedia content one time, and may be barred from subsequent playback.

Additionally, depending on the capabilities of the system that detainee 106 is permitted to use at the incarceration facility, unidirectional communication system 120 may enable detainee 106 to select and to generate a printout of an image of the approved multimedia content that detainee 106 can keep during incarceration. Further, unidirectional communication system 120 may enable the detainee to mark the approved multimedia content for saving and delivery to detainee 106 upon release from the incarceration facility. Then, when detainee 106 is released from the incarceration facility, unidirectional communication system 120 may cause the marked approved multimedia content to be stored to a storage media, such as a compact disk (CD) or digital video disk (DVD) that is then given to detainee 106 upon release. In some instances, unidirectional communication system 120 may be enabled to collect a fee for the storage media provided to detainee 106 in this manner.

In some embodiments, detainee 106 may be enabled to mark certain multimedia content for printout, such as individual frames of a video, or a photograph of family members, for example, that may be provided to detainee 106 during incarceration. The marking by detainee 106 may occur as detainee 106 views the multimedia content and provides an indication, such as a request, to mark the desired portion of the multimedia content. The indication or request from detainee 106 may be subject to approval by facility administrator 104. For example, facility administrator 106 may review the marked multimedia content and may approve or deny the request from detainee 106. When the request by detainee 106 is approved by facility administrator 104, facility administrator 104 may cause a hardcopy printout of the marked multimedia content to be provided to detainee 106 during incarceration. For example, detainee 106 may be permitted to keep such hardcopy printouts and to display such hardcopy printouts during incarceration for viewing by detainee 106.

In a further aspect, system architecture 100 and unidirectional communication system 120 may also be enabled to receive administrative multimedia content (not shown) that is uploaded for playback by detainee 106 that does not originate from outside contactperson 102. For example, in one embodiment, facility administrator 104 may provide the administrative multimedia content that is intended for playing by detainee 106. For example, facility administrator 104 may upload the administrative multimedia content via admin network 114, such as for storage on database 204-1 (see FIG. 2).

In various embodiments, the administrative multimedia content may comprise informational or educational videos that may include content intended for detainee 106 that is provided by an organization that manages the incarceration facility, such as from the management or leadership of the organization. Thus, the administrative multimedia content may enable wardens or other personnel to provide information and updates that are intended for all or some detainees of the incarceration facility, such as detainee 106. The information or updates may be important information relating to topics or guidance provided to detainee 106 related to incarceration. Examples of the administrative multimedia content for a prison environment may include a message from the warden, or information that confirms or reinforces verbal information previously provided to detainee 106 by wardens or other personnel of the incarceration facility.

In some cases, using unidirectional communication system 120 to provide the administrative multimedia content to detainee 106 may be used in cases where detainee 106 is otherwise isolated, such as during a public health emergency, such as a pandemic, or other circumstances that involve restrictions to personal contact between individuals.

In still some further embodiments, unidirectional communication system 120 may include means for generating multimedia content, such as by supporting video acquisition and production to generate various types of multimedia content for playing by detainee 106.

Figure 2:
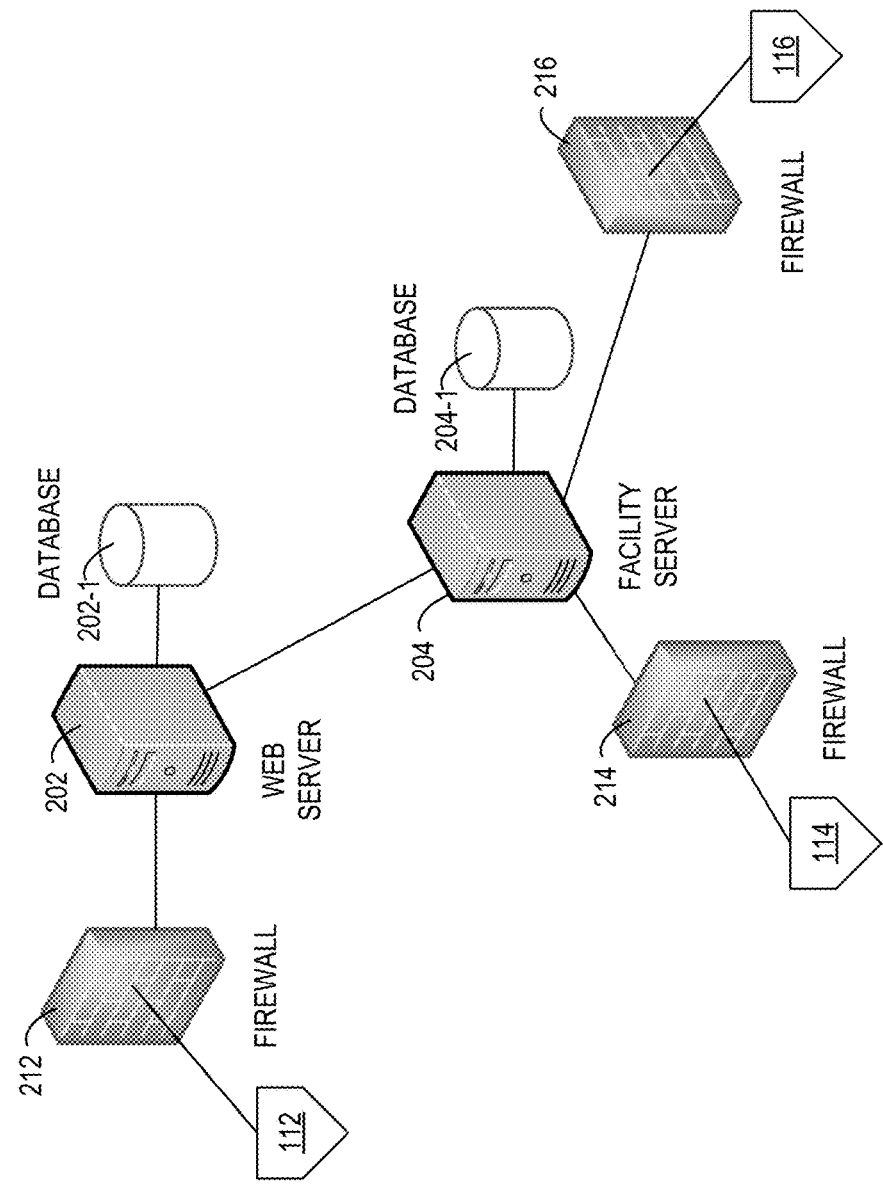
FIG. 2 is a block diagram of selected elements of a unidirectional communication system.

Turning now to FIG. 2, further internal details of unidirectional communication system 120 are shown in one embodiment. It is noted that FIG. 2 represents one particular implementation of unidirectional communication system 120 and that various other implementations are contemplated herein. For example, unidirectional communication system 120 may include fewer or more elements in various embodiments. It is also noted that unidirectional communication system 120 may include various sub-elements, sub-modules, internal networks, protocols, applications, or other sub-components that are not explicitly depicted in FIG. 2 for descriptive clarity.

As shown in FIG. 2, unidirectional communication system 120 may be secured by firewalls 212, 214, 216 that respectively protect unidirectional communication system 120 from undesired access via public network 112, admin network 114, facility network 116. Firewall 212 protects a web server 202 while firewalls 114 and 116 protect a facility server 204. Web server 202 may include, or be associated with, a database 202-1, while facility server 204 may include, or may be associated with, a database 204-1. It is noted that in some embodiments, at least one of database 202-1 and 204-1 may itself represent a database server system.

In operation of unidirectional communication system 120 as shown in FIG. 2, web server 202 may receive requests for content, such as a request specifying a uniform resource locator (URL), and may respond to (e.g., serve) a particular request with content corresponding to the particular request.

In this manner, for example, web server 202 may provide the first user interface, such as on a web page with an interactive user interface. Information or data associated with the first user interface may be stored using database 202-1, such as under an index associated with outside contactperson 102. Furthermore, web server 202 may be enabled to access facility server 204, such as to access database 204-1, which may store information associated with detainee 106 or the incarceration facility. It is noted that at least some of the multimedia content uploaded by outside contactperson 102 for playing by detainee 106, or at least some of the approved multimedia content reviewed by facility administrator 104, may be stored at database 202-1 or at database 204-1 or both. Facility server 204 may represent a server associated with the incarceration facility, and may include at least some components or elements that are located at the incarceration facility. As shown, firewall 214 may be used in conjunction with the second user interface that may be provided by facility server 214 to enable facility administrator 104 to access unidirectional communication system 120. Firewall 216 may be used in conjunction with the third user interface that may be provided by facility server 214 to enable detainee 106 to access unidirectional communication system 120, such as for playback of approved multimedia content.

FIGS. 3A and 3B depict respective block diagram of selected elements of account options for unidirectional communication system 120. As will be described in further detail below, outside contactperson 102 may create an account using unidirectional communication system 120 in order to upload and send multimedia content to detainee 106 for playing by detainee 106. In FIG. 3A, account option 300 depicts multiple detainees 106 per outside contactperson 102. Specifically, outside contactperson 102 is shown having an account for a first detainee 106-1, a second detainee 106-2, up to N number of detainees 106-N, where N is an integer greater than or equal to 1. Thus, outside contactperson 102 may associate their account with N number of detainees 106, who may be at different locations or incarcerated at different incarceration facilities. In FIG. 3B, account option 301 depicts multiple outside contactpersons 102 per detainee 106. Specifically, detainee 106 is shown being associated with respective accounts for a first outside contactperson 102-1, a second outside contactperson 102-2, up to M number of outside contactpersons 102-M, where M is an integer greater than or equal to 1 and is independent of N. Thus, detainee 106 may independently receive multimedia content from M number of outside contactpersons 102.

Figure 4:
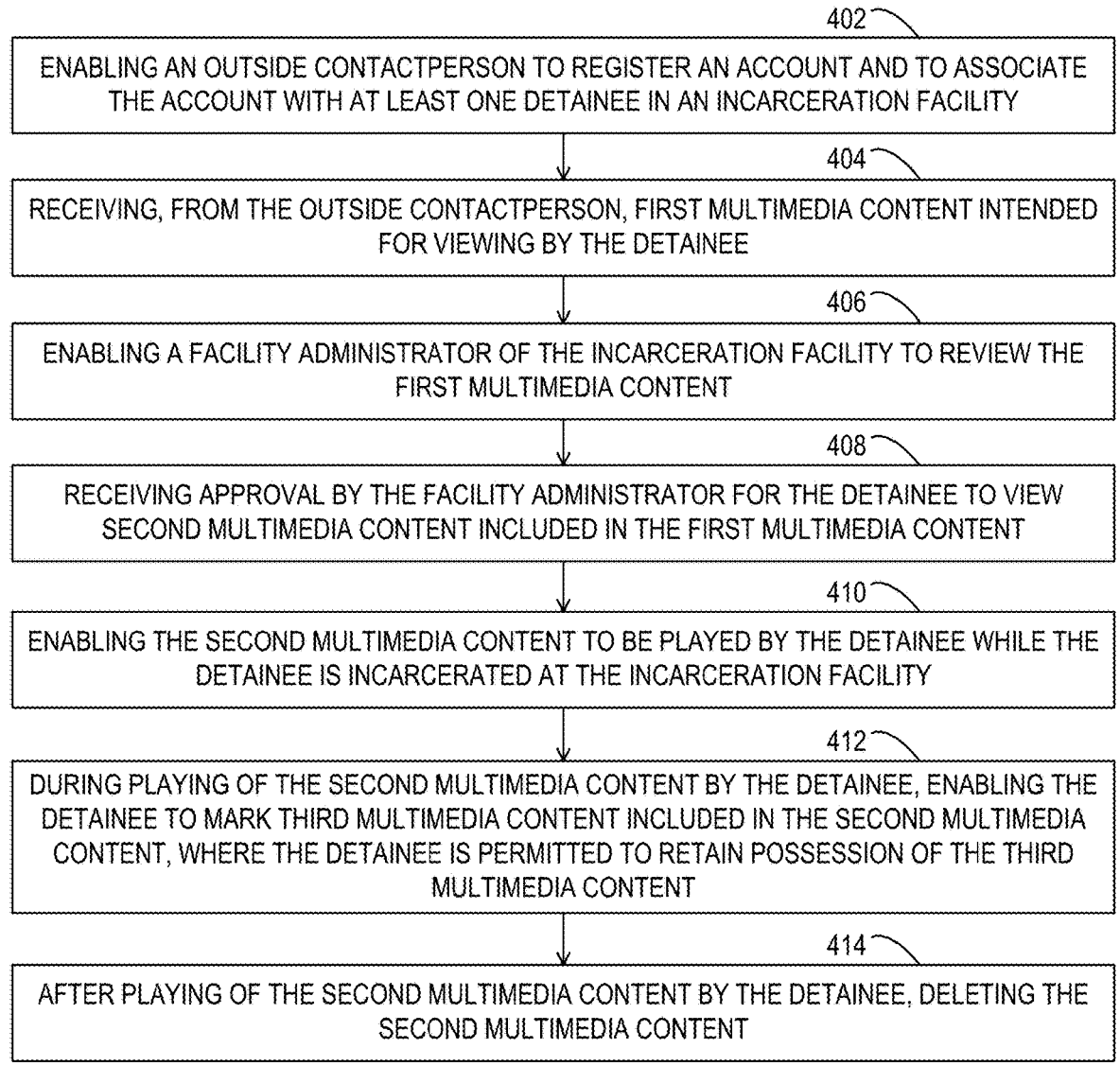
FIGS. 4, 5 and 6 are respective flow charts of selected elements of a method for unidirectional communication for public access to detained persons.

Referring now to FIG. 4, a method 400 for unidirectional communication for public access to detained persons is depicted in flow-chart format. Method 400 may be executed by unidirectional communication system 120 or portions thereof. It is noted that certain elements of method 400 may be omitted or rearranged in various embodiments.

Method 400 begins at step 402 by enabling an outside contactperson to register an account and to associate the account with at least one detainee in an incarceration facility. As noted with respect to FIGS. 3A and 3B, outside contactperson 102 may associate their account with N number of detainees 106, while detainee 106 may be associated with M number of outside contactpersons 102. At step 404, first multimedia content intended for viewing by the detainee is received from the outside contactperson. At step 406, a facility administrator of the incarceration facility is enabled to review the first multimedia content. For example, at step 406, at least a portion of unidirectional communication system 120 may be executed on computer systems associated with the incarceration facility. At step 408, approval by the facility administrator for the detainee to view second multimedia content included in the first multimedia content is received. At step 408, facility administrator 104 may approve a portion of the first multimedia content to determine the second multimedia content. Thus, the second multimedia content is included in the first multimedia content. The approved portion (second multimedia content) may represent portions of the first multimedia content that are not subject to denial facility administrator 104 by for viewing by detainee 106. It is noted that step 408 may be performed without knowledge of detainee 106. At step 410, the second multimedia content is enabled for playing by the detainee while the detainee is incarcerated at the incarceration facility. At step 410, detainee 106 may be provided a secure computer system to use to play the second multimedia content. The secure computer system may be enabled to execute at least a portion of unidirectional communication system 120. During playing of the second multimedia content by the detainee, at step 412, the detainee is enabled to mark third multimedia content included in the second multimedia content, where the detainee is permitted to retain possession of the third multimedia content. In some embodiments, the third multimedia content comprises the entirety of the second multimedia content. In other embodiments, the third multimedia content comprises images included in the second multimedia content. After playing of the second multimedia content by the detainee, at step 414, the second multimedia content is deleted. In some embodiments, at step 414 or at another time, the first multimedia content may also be deleted.

Figure 5:
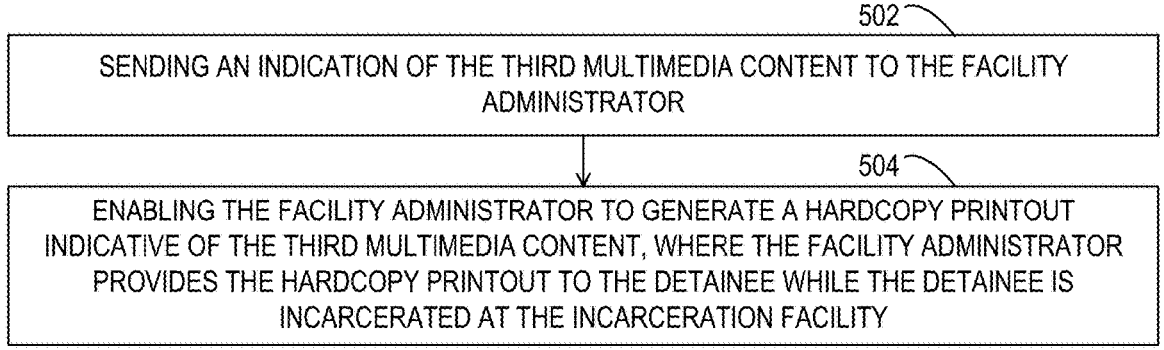

Referring now to FIG. 5, a method 412-1 for unidirectional communication for public access to detained persons is depicted in flow-chart format. Method 412-1 may represent an embodiment of step 412, or portions thereof, as shown in method 400 (see FIG. 4). It is noted that certain elements of method 412-1 may be omitted or rearranged in various embodiments.

Method 412-1 may begin at step 502 by sending an indication of the third multimedia content to the facility administrator. At step 504, the facility administrator is enabled to generate a hardcopy printout indicative of the third multimedia content, where the facility administrator provides the hardcopy printout to the detainee while the detainee is incarcerated at the incarceration facility.

Figure 6:
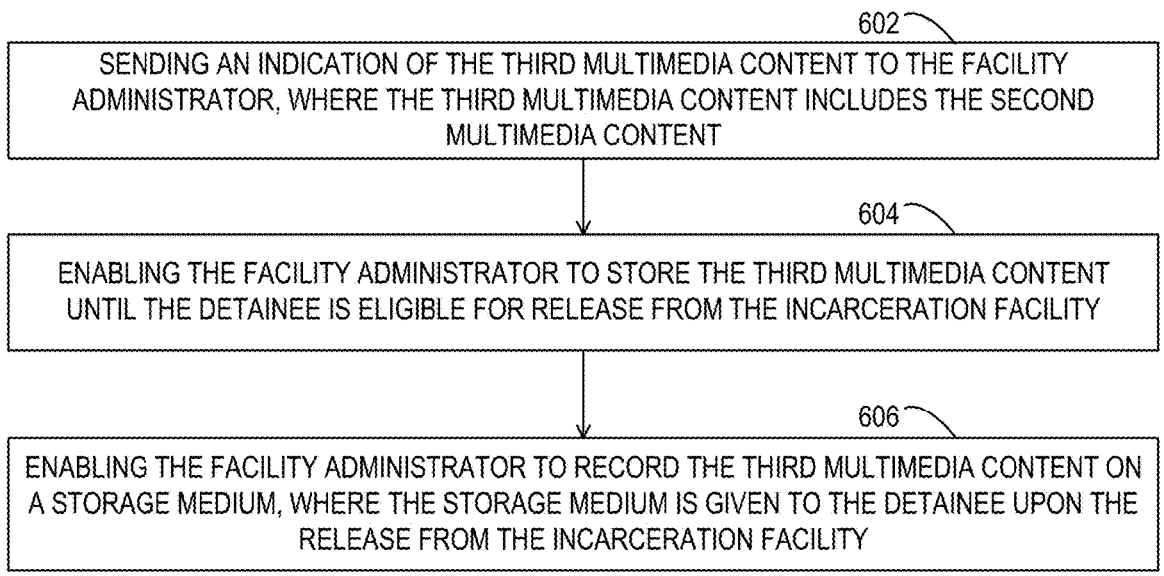

Referring now to FIG. 6, a method 412-2 for unidirectional communication for public access to detained persons is depicted in flow-chart format. Method 412-2 may represent an embodiment of step 412, or portions thereof, as shown in method 400 (see FIG. 4). It is noted that certain elements of method 412-2 may be omitted or rearranged in various embodiments.

Method 412-2 may begin at step 602 by sending an indication of the third multimedia content to the facility administrator, where the third multimedia content includes the second multimedia content. At step 604, the facility administrator is enabled to store the third multimedia content until the detainee is eligible for release from the incarceration facility. At step 604, the third multimedia content may be stored at database 204-1, for example. At step 606, the facility administrator is enabled to record the third multimedia content on a storage medium, where the storage medium is given to the detainee upon the release from the incarceration facility.

Figure 7:
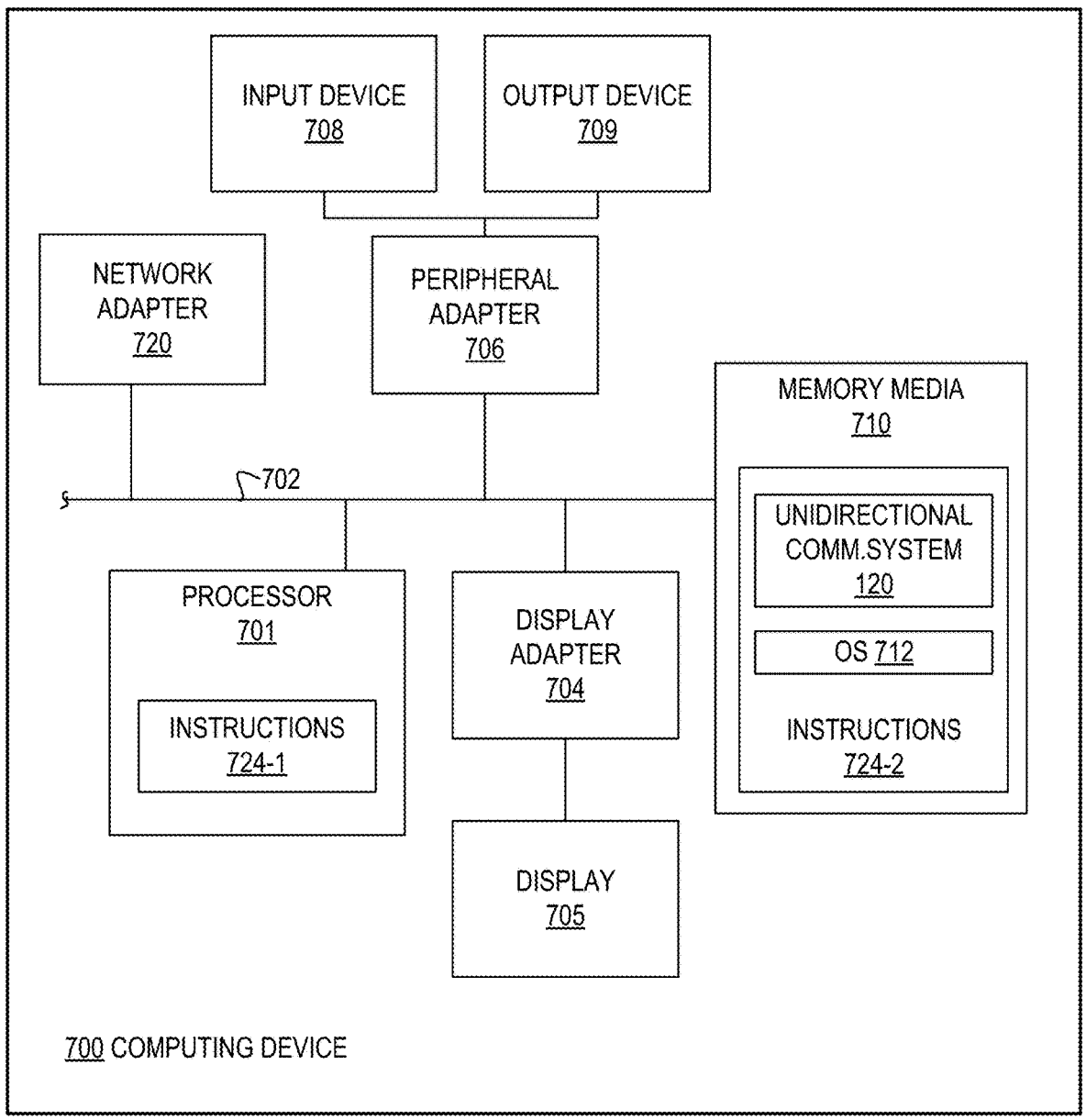
FIG. 7 is a block diagram of selected elements of a computer system.

FIG. 7 depicts a block diagram illustrating selected elements of an embodiment of a computing device 700 for a unidirectional communication system for public access to detained persons, according to the present disclosure. In various embodiments, computing device 700 may represent an implementation of web server 202 or facility server 204. In the embodiment depicted in FIG. 7, device 700 includes processor 701 coupled via shared bus 702 to storage media collectively identified as memory media 710.

Device 700, as depicted in FIG. 7, further includes network adapter 720 that interfaces device 700 to a network (not shown in FIG. 7). In embodiments suitable for use in communication systems, device 700, as depicted in FIG. 7, may include peripheral adapter 706, which provides connectivity for the use of input device 708 and output device 709. Input device 708 may represent a device for user input, such as a keyboard or a mouse, or even a video camera. Output device 709 may represent a device for providing signals or indications to a user, such as loudspeakers for generating audio signals.

Device 700 is shown in FIG. 7 including display adapter 704 and further includes a display device or, more simply, a display 705. Display adapter 704 may interface shared bus 702, or another bus, with an output port for one or more displays, such as display 705. Display 705 may be implemented as a liquid crystal display screen, a computer monitor, a television or the like. Display 705 may comply with a display standard for the corresponding type of display. Standards for computer monitors include analog standards such as video graphics array (VGA), extended graphics array (XGA), etc., or digital standards such as digital visual interface (DVI), definition multimedia interface (HDMI), DisplayPort (DP), among others. A television display may comply with standards such as NTSC (National Television System Committee), PAL (Phase Alternating Line), or another suitable standard. Display 705 may include an output device 709, such as one or more integrated speakers to play audio content, or may include an input device 708, such as a microphone or video camera.

Memory media 710 encompasses persistent and volatile media, fixed and removable media, and magnetic and semiconductor media. Memory media 710 is operable to store instructions, data, or both. Memory media 710 as shown includes sets or sequences of instructions 724-2, namely, an operating system 712 and unidirectional communication system 120. Operating system 712 may be a UNIX® or LINUX or UNIX-like operating system, a Windows® family operating system, a MacOS® or iOS® operating system, an Android operating system, or another suitable operating system. Instructions 724 may also reside, completely or at least partially, within processor 701 during execution thereof. It is further noted that processor 701 may be configured to receive instructions 724-1 from instructions 724-2 via shared bus 702. In some embodiments, memory media 710 is configured to store and provide executable instructions for executing unidirectional communication system 120, as mentioned previously.

As disclosed herein, a unidirectional communication system for public access to detained persons enables a facility administrator of an incarceration facility to review and approve multimedia content provided by an outside contactperson for playback by a detainee of the incarceration facility. The unidirectional communication system may enable an outside contactperson to communicate with a plurality of detainees or a detainee to receive communications from a plurality of outside contactpersons.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A system for unidirectional communication for public access to detained persons, the system comprising at least one processor having access to memory media storing instructions executable by the processor for:
enabling an outside contact person to register an account and to associate the account with at least one detainee in an incarceration facility;
receiving, from the outside contactperson, first multimedia content intended for viewing by the detainee;
enabling a facility administrator of the incarceration facility to review the first multimedia content;
responsive to the facility administrator reviewing the first multimedia content, receiving approval by the facility administrator for the detainee to view second multimedia content included in the first multimedia content;
responsive to the facility administrator approving the second multimedia content, enabling the second multimedia content to be played by the detainee while the detainee is incarcerated at the incarceration facility;
during playing of the second multimedia content by the detainee, enabling the detainee to mark third multimedia content included in the second multimedia content, wherein the detainee is permitted to retain possession of the third multimedia content; and
after playing of the second multimedia content by the detainee, deleting the second multimedia content,
wherein the detainee being permitted to retain possession of the third multimedia content further comprises instructions for:
sending an indication of the third multimedia content to the facility administrator, wherein the third multimedia content includes the second multimedia content;
enabling the facility administrator to store the third multimedia content until the detainee is eligible for release from the incarceration facility; and
enabling the facility administrator to record the third multimedia content on a storage medium, wherein the storage medium is given to the detainee upon the release from the incarceration facility.

2. The system of claim 1, wherein the detainee being permitted to retain possession of the third multimedia content further comprises instructions for:
sending an indication of the third multimedia content to the facility administrator; and
enabling the facility administrator to generate a hardcopy printout indicative of the third multimedia content, wherein the facility administrator provides the hardcopy printout to the detainee while the detainee is incarcerated at the incarceration facility.

3. The system of claim 1, further comprising instructions for at least one of:
charging the detainee for the third multimedia content; and
charging the outside contactperson for receiving the first multimedia content.

4. The system of claim 1, further comprising instructions for:
receiving administrative multimedia content from the facility administrator; and
enabling the detainee to playback the administrative multimedia content.

5. The system of claim 1, further comprising instructions for:

enabling the outside contactperson to search from a plurality of detainees to identify the detainee.

6. The system of claim 1, further comprising instructions for:
enabling the outside contactperson to search from a plurality of incarceration facilities to identify the detainee.

7. The system of claim 1, further comprising instructions for:
enabling the outside contactperson to search for a plurality of detainees, including the detainee; and
associating the account with the plurality of detainees.

8. The system of claim 1, wherein enabling the detainee to playback the second multimedia content while the detainee is incarcerated at the incarceration facility further comprises instructions for:
enabling the detainee to playback the second multimedia content one time on a secure device at the incarceration facility.

9. The system of claim 1, further comprising instructions for:
enabling a plurality of outside contactpersons to respectively associate a plurality of accounts with the detainee.

10. A computer-implemented method for unidirectional communication for public access to detained persons, the method comprising:
enabling an outside contactperson to register an account and to associate the account with at least one detainee in an incarceration facility;
receiving, from the outside contactperson, first multimedia content intended for viewing by the detainee;
enabling a facility administrator of the incarceration facility to review the first multimedia content;
responsive to the facility administrator reviewing the first multimedia content, receiving approval by the facility administrator for the detainee to view second multimedia content included in the first multimedia content;
responsive to the facility administrator approving the second multimedia content, enabling the second multimedia content to be played by the detainee while the detainee is incarcerated at the incarceration facility;
during playing of the second multimedia content by the detainee, enabling the detainee to mark third multimedia content included in the second multimedia content, wherein the detainee is permitted to retain possession of the third multimedia content; and
after playing of the second multimedia content by the detainee, deleting the second multimedia content,
wherein the detainee being permitted to retain possession of the third multimedia content further comprises:
sending an indication of the third multimedia content to the facility administrator, wherein the third multimedia content includes the second multimedia content;
enabling the facility administrator to store the third multimedia content until the detainee is eligible for release from the incarceration facility; and
enabling the facility administrator to record the third multimedia content on a storage medium, wherein the storage medium is given to the detainee upon the release from the incarceration facility.

11. The method of claim 10, wherein the detainee being permitted to retain possession of the third multimedia content further comprises:
sending an indication of the third multimedia content to the facility administrator; and
enabling the facility administrator to generate a hardcopy printout indicative of the third multimedia content, wherein the facility administrator provides the hardcopy printout to the detainee while the detainee is incarcerated at the incarceration facility.

12. The method of claim 10, further comprising at least one of:
charging the detainee for the third multimedia content; and
charging the outside contactperson for receiving the first multimedia content.

13. The method of claim 10, further comprising:
receiving administrative multimedia content from the facility administrator; and
enabling the detainee to playback the administrative multimedia content.

14. The method of claim 10, further comprising:
enabling the outside contactperson to search from a plurality of detainees to identify the detainee.

15. The method of claim 10, further comprising:
enabling the outside contactperson to search from a plurality of incarceration facilities to identify the detainee.

16. The method of claim 10, further comprising:
enabling the outside contactperson to search for a plurality of detainees, including the detainee; and
associating the account with the plurality of detainees.

17. The method of claim 10, wherein enabling the detainee to playback the second multimedia content while the detainee is incarcerated at the incarceration facility further comprises:
enabling the detainee to playback the second multimedia content one time on a secure device at the incarceration facility.

18. The method of claim 10, further comprising:
enabling a plurality of outside contactpersons to respectively associate a plurality of accounts with the detainee.

* * * * *